(12) United States Patent
Yoon et al.

(10) Patent No.: US 8,520,795 B2
(45) Date of Patent: Aug. 27, 2013

(54) INTERMEDIATE END PLUG ASSEMBLY FOR SEGMENTED FUEL ROD AND SEGMENTED FUEL ROD HAVING THE SAME

(75) Inventors: Kyung Ho Yoon, Daejeon (KR); Jae Yong Kim, Daejeon (KR); Young Ho Lee, Daejeon (KR); Kun Woo Song, Daejeon (KR); Tae Hyun Chun, Daejeon (KR); Dong Seok Oh, Daejeon (KR); Wang Ki In, Daejeon (KR); Hyung Kyu Kim, Daejeon (KR); Chang Hwan Shin, Gyeonggi-do (KR); Kang Hee Lee, Daejeon (KR)

(73) Assignee: Korea Atomic Energy Research Institute, Seoul (KR)

( * ) Notice: Subject to any disclaimer, the term of this patent is extended or adjusted under 35 U.S.C. 154(b) by 588 days.

(21) Appl. No.: 12/420,874

(22) Filed: Apr. 9, 2009

(65) Prior Publication Data

US 2010/0128835 A1    May 27, 2010

(30) Foreign Application Priority Data

Nov. 25, 2008    (KR) .................. 10-2008-0117334

(51) Int. Cl.
    *G21C 3/10* (2006.01)
(52) U.S. Cl.
    USPC ............ 376/451; 376/409; 376/426; 376/429

(58) Field of Classification Search
    USPC .................. 376/440, 451, 409, 426, 429, 433
    See application file for complete search history.

(56) References Cited

U.S. PATENT DOCUMENTS

| | | | | |
|---|---|---|---|---|
| 3,153,280 A * | 10/1964 | Jones et al. | | 228/126 |
| 3,211,627 A * | 10/1965 | Thorp, II | | 376/420 |
| 4,111,748 A * | 9/1978 | Hayashi et al. | | 376/412 |
| 4,492,668 A * | 1/1985 | Pilgrim et al. | | 376/440 |
| 6,379,485 B1 | 4/2002 | Borglum | | |
| 2008/0013667 A1 * | 1/2008 | Oh et al. | | 376/451 |

* cited by examiner

*Primary Examiner* — Jack W Keith
*Assistant Examiner* — Marshall O'Connor
(74) *Attorney, Agent, or Firm* — Maier & Maier PLLC

(57) ABSTRACT

An intermediate end plug assembly for a segmented fuel rod can stably support the fuel rod to the end of its cycle even if an interval between the fuel rods becomes narrow due to application of a dual-cooled fuel rod, and reduce excess vibration induced by flows of interior and exterior channels of the dual-cooled fuel rod for obtaining high burnup and output. To this end, the fuel rod has a segmented structure so as to make its length short. A lower intermediate end plug includes at least one channel hole, through which a coolant flows into an internal channel of the fuel rod, so that a possibility of causing departure from nuclear boiling ratio (DNBR) of the dual-cooled fuel rod is reduced.

8 Claims, 10 Drawing Sheets

INTERMEDIATE END PLUG ASSEMBLY FOR SEGMENTED FUEL ROD AND SEGMENTED FUEL ROD HAVING THE SAME

CROSS-REFERENCES TO RELATED APPLICATION

This patent application claims the benefit of priority under 35 U.S.C. §119 from Korean Patent Application No. 10-2008-117334 filed on Nov. 25, 2008, the contents of which are incorporated herein by reference.

BACKGROUND OF THE INVENTION

1. Field of the Invention

The present invention relates, in general, to an end plug for a dual-cooled fuel rod and, more particularly, to an intermediate end plug assembly for a segmented fuel rod, capable of stably supporting the fuel rod to the end of its cycle even if an interval between the fuel rods becomes narrow due to application of a dual-cooled fuel rod, and reducing excess vibration induced by flows of interior and exterior channels of the dual-cooled fuel rod for obtaining high burnup and output.

2. Description of the Related Art

A nuclear fuel assembly is charged in the core of a pressurized water reactor. This nuclear fuel assembly is composed of a plurality of fuel rods, in each of which a cylindrical uranium sintered compact (or a cylindrical uranium pellet) is inserted.

The fuel rods can be divided into two types, cylindrical and annular, according to shape. The annular fuel rods are called dual-cooled fuel rods.

In comparison with the pellet of the cylindrical fuel rod, the pellet of the annular fuel rod has a low internal temperature due to a thinner thickness and a wider heat transfer area, and thus a relatively higher safety margin.

FIG. 1 is a schematic front view illustrating a conventional cylindrical nuclear fuel assembly. Referring to FIG. 1, the nuclear fuel assembly 10 includes fuel rods 11, spacer grids 15, guide thimbles 13, an upper end fitting 17 and a lower end fitting 16.

Each fuel rod 11 has a structure in which a uranium sintered compact or a uranium pellet (not shown) generating high-temperature heat through nuclear fission is enclosed by a zirconium alloy cladding tube.

Each fuel rod 11 has upper and lower end plugs 18 and 19 coupled to lower and upper portions thereof so as to prevent inert gas filled between the cladding tubes thereof from leaking out.

Meanwhile, the fuel rod 11 is a structure having a considerably long length compared to the diameter thereof. When this structure having a great elongation ratio is put under the flow of a coolant, the fuel rod 11 causes flow-induced vibrations due to the flow of the coolant. Thus, in order to reduce this flow-induced vibration, the structure called a spacer grid 15 is installed in a predetermined section with respect to the entire length of the fuel rods 11 so as to support the fuel rods 11, thereby preventing the fuel rods 11 from being vibrated by the flow of the coolant.

However, in the case of the dual-cooled fuel rod designed to charge nuclear fuel into an annular space defined by a dual tube of inner and outer tubes, the spacer grid taking charge of an important function of inhibiting the vibration of the fuel rods caused by the flow of the coolant has no choice but to support only the outer tube of each fuel rod due to its structure. Due to the limitation of this supporting structure, in the case of the inner tube having the elongation ratio of about 400 or more, only opposite ends of each fuel rod are supported by the upper and lower end plugs.

Of course, in the case of the dual-cooled fuel rod, a uranium dioxide ($UO_2$) pellet exists between the inner and outer tubes. Thus, the vibration of the inner tube is expected to be inhibited to a certain extent. However, in considering the fuel rod having the elongation ratio of about 400 or more, it is easily expected that a vibration amplitude of the inner tube is remarkably great, as compared to the outer tube having numerous support points formed in an axial direction of the fuel rod by the spacer grid.

Further, in the case of the typical fuel rod as shown in FIG. 2, since a coolant channel is formed outside the fuel rod, a phenomenon in which the flow of the coolant in the reactor core is restricted mainly occurs due to foreign materials in the reactor core. Thus, since cooling performance of the fuel rod is sufficiently maintained if the foreign materials are screened to a certain extent before they enter the reactor core, such a phenomenon is mainly overcome by additionally installing an apparatus for filtering the foreign materials on the lower end fitting or a support for filtering the foreign materials above the lower end fitting.

However, in the case of the dual-cooled fuel rod which obtains economical effects by lowering a central temperature of the nuclear fuel to secure stability of the nuclear fuel at a very high burnup together with high output, another problem occurs. This is because, in the case of the dual-cooled fuel rod, the coolant channel is formed outside the fuel rod, but the coolant flows in the fuel rod in order to increase the cooling performance, so that the coolant channel is formed inside the fuel rod. This coolant channel formed inside the fuel rod has an advantage in that it increases the cooling performance and thus the output of the nuclear fuel, but it has a disadvantage in that, if it is blocked, the fuel rod is greatly exposed to a danger of departure from nuclear boiling ratio (DNBR). Particularly, since the internal coolant channel of the dual-cooled fuel rod has a very narrow flow cross-sectional area, it is in high danger of being blocked although only small foreign materials get into it.

In this manner, if the internal coolant channel of the dual-cooled fuel rod is blocked and as a result a smooth flow of the coolant is obstructed, the coolant does not flow in the fuel rod, and thus is stagnant. Thereby, the dual-cooled fuel rod is exposed to the danger of DNBR. However, since the internal coolant channel does not exist in the conventional fuel rod, a new resolution to the dual-cooled fuel rod must be found.

SUMMARY OF THE INVENTION

Accordingly, the present invention has been made keeping in mind the above problems occurring in the related art, and embodiments of the present invention provide an intermediate end plug assembly for a segmented fuel rod, in which the segmented fuel rod has a half or quarter of a length of a typical fuel rod, and intermediate end plugs mounted on upper and lower ends thereof, so that a dual-cooled fuel rod having the segmented fuel rods supported at an intermediate position thereof is enabled unlike the typical fuel rod, and thus vibration displacement induced by a coolant flowing in an internal channel of the dual-cooled fuel rod is reduced.

Further, there is provided an intermediate end plug assembly for a segmented fuel rod, in which, when a channel for a coolant is blocked at a lower end of an entire fuel rod (i.e. upstream of the coolant), the coolant can be complemented through a complementary channel hole formed in a lower intermediate end plug located above the segmented fuel rod, thereby reducing a possibility of causing departure from nuclear boiling ratio (DNBR) attributable to the failure to supply the coolant to the entire internal channel of a dual-cooled fuel rod.

To sum up, the segmented fuel rod has the complementary channel holes in the upper and lower intermediate end plugs thereof in order to provide a path along which the coolant flows through the complementary channel holes formed in the upper and lower intermediate end plugs when the internal channel for dual cooling is blocked at the lower end of the entire fuel rod, thereby reducing the possibility of causing the DNBR in the internal channel, and simultaneously in order to form support points for supporting the fuel rod through the segmented fuel rods, thereby inhibiting flow-induced vibration of an inner cladding tube of the fuel rod to promote structural soundness of the entire fuel rod.

According to an aspect of the present invention, there is provided an intermediate end plug assembly for a segmented fuel rod, which includes: a first end plug having a cylindrical body, in a center of which a through-hole is formed in a longitudinal direction, the cylindrical body having an annular groove in one of circular upper and lower surfaces thereof between an outer circumference thereof and an outer circumference of the through-hole, and an annular protrusion protruding along an outer circumference thereof and a first flat coupling face inside the protrusion on the other surface thereof; and a second end plug having a cylindrical member, which has a body and a through-hole having diameters identical to those of the respective body and through-hole of the first end plug, the body of the second end plug having a groove identical to the groove of the first end plug in one of circular upper and lower surfaces thereof, and a cylindrical insert having an annular space along an outer circumference thereof so as to correspond to the annular protrusion of the first end plug and a second flat coupling face on an upper surface of the insert on a second surface thereof. The protrusion of the first end plug is inserted into the annular space of the second end plug, so that the first and second coupling faces come into close contact with each other.

Here, the protrusion of the first end plug may have "L" shaped coupling recesses, each of which is partially open, and the insert of the second end plug has latches fitting into the respective coupling recesses on an outer circumference thereof, such that the first end plug can be simply and rapidly coupled with the second end plug. The coupling recesses and the latches may be equal to each other in number, and the latches may be formed on the outer circumference of the inset of the second end plug so as to correspond to a position where the coupling recesses are formed.

Particularly, each coupling recess may include a seat having a locking step protruding in a shape of a hill, so that the coupling recesses can be prevented from being released from the latches.

Meanwhile, in comparison of inner and outer annular faces located inside and outside grooves of the first and second end plugs, the former may protrude higher than the latter.

At least one of the first and second end plugs may have at least one complementary channel hole communicating with the through-hole.

According to another aspect of the present invention, there is provided a dual-cooled fuel rod, which includes: a segmented upper fuel rod adopting the first end plug having the aforementioned configuration as a lower intermediate end plug thereof; and a segmented lower fuel rod adopting the second end plug having the aforementioned configuration as an upper intermediate end plug thereof. Thus, the dual-cooled fuel rod is formed by the coupling of two segmented fuel rods, each of which has half an elongation ratio compared to that of a conventional dual-cooled fuel rod.

According to another aspect of the present invention, there is provided a dual-cooled fuel rod, which includes: a segmented upper fuel rod adopting the second end plug as a lower intermediate end plug thereof; and a segmented lower fuel rod adopting the first end plug as an upper intermediate end plug thereof. In other words, the first end plug can be freely selected as the upper or lower intermediate end plug, and thus does not need to be limited to only the lower intermediate end plug.

Here, the dual-cooled fuel rod may further include at least one segmented intermediate fuel rod between the segmented upper and lower fuel rods. The segmented intermediate fuel rod may include the first and second end plugs at respective opposite ends thereof. This means that the dual-cooled fuel rod can be configured of at least three segmented fuel rods. Thus, the dual-cooled fuel rod can freely adjust the elongation ratio of each segmented fuel rod.

Accordingly, each of the segmented upper, lower and intermediate fuel rods may have an elongation ratio ranging from 100 to 200.

Meanwhile, at least one of the first and second end plugs may have at least one complementary channel hole which communicates with the through-hole and is inclined toward the segmented upper fuel rod.

Further, each of the segmented upper, lower and intermediate fuel rods may have a plenum spring and a spacer installed in an inner annular space thereof.

According to embodiments of the present invention, the intermediate end plug assembly for a segmented fuel rod is configured to be applied to each dual-cooled fuel rod having a segmented structure, so that the inner cladding tube of the segmented dual-cooled fuel rod coupled through the upper and lower intermediate end plugs can be supported at numerous support positions. As the number of support positions of the inner cladding tube increases, the displacement resulting from the flow-induced vibration can be remarkably reduced. Since the reduction of the displacement resulting from the flow-induced vibration improves support performance of the fuel rod, a possibility of causing damage resulting from fretting attrition can also be remarkably reduced.

Further, since the complementary channel holes are formed in the upper and lower intermediate end plugs, and the coolant flows into the internal channel of the inner cladding tube through the complementary channel holes, the cooling performance of the dual-cooled fuel rod can be maintained in the case in which the coolant is not supplied to the internal channel of the inner cladding tube when the channel is blocked at the lower end of the segmented lower fuel rod, so that the possibility of causing the DNBR of the dual-cooled fuel rod can be reduced.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to an exemplary embodiment of the invention with reference to the accompanying drawings.

FIGS. 3 through 6 illustrate first and second end plugs configured as upper and lower intermediate end plugs for a segmented fuel rod according to an embodiment of the present invention.

Figure 1:
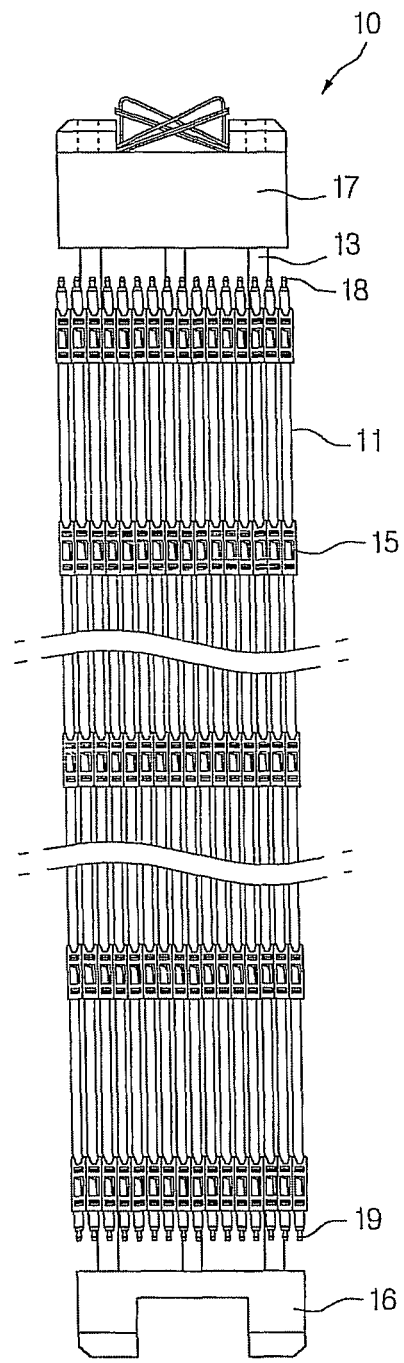
FIG. 1 is a schematic front view illustrating a conventional cylindrical nuclear fuel assembly.
Figure 2:
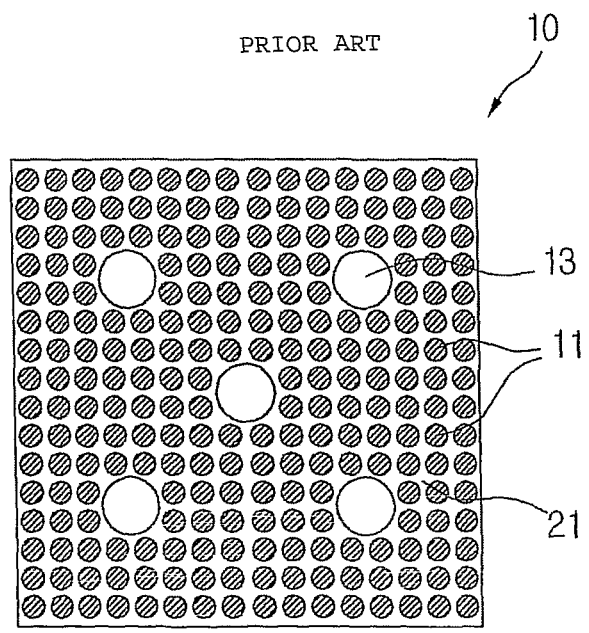
FIG. 2 is a cross-sectional view cutting out the cylindrical nuclear fuel assembly of FIG. 1 in a transverse direction.
Figure 3:
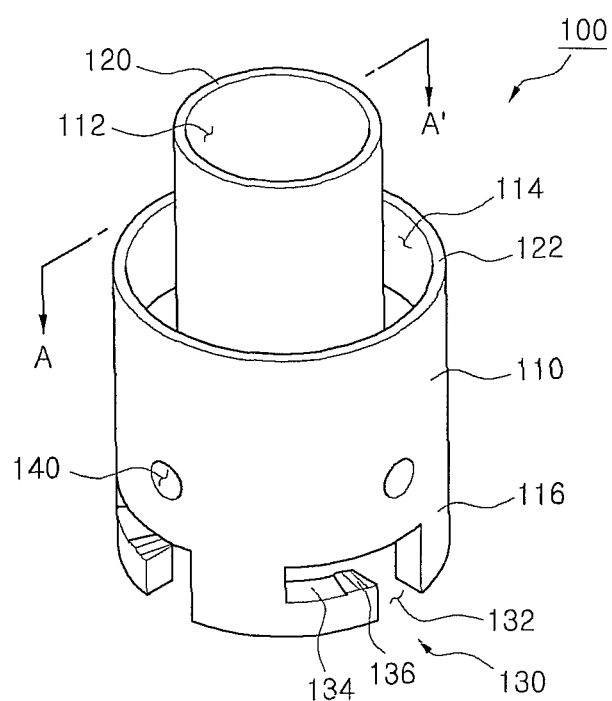
FIG. 3 is a perspective view illustrating a first end plug according to an embodiment of the present invention.
Figure 5:
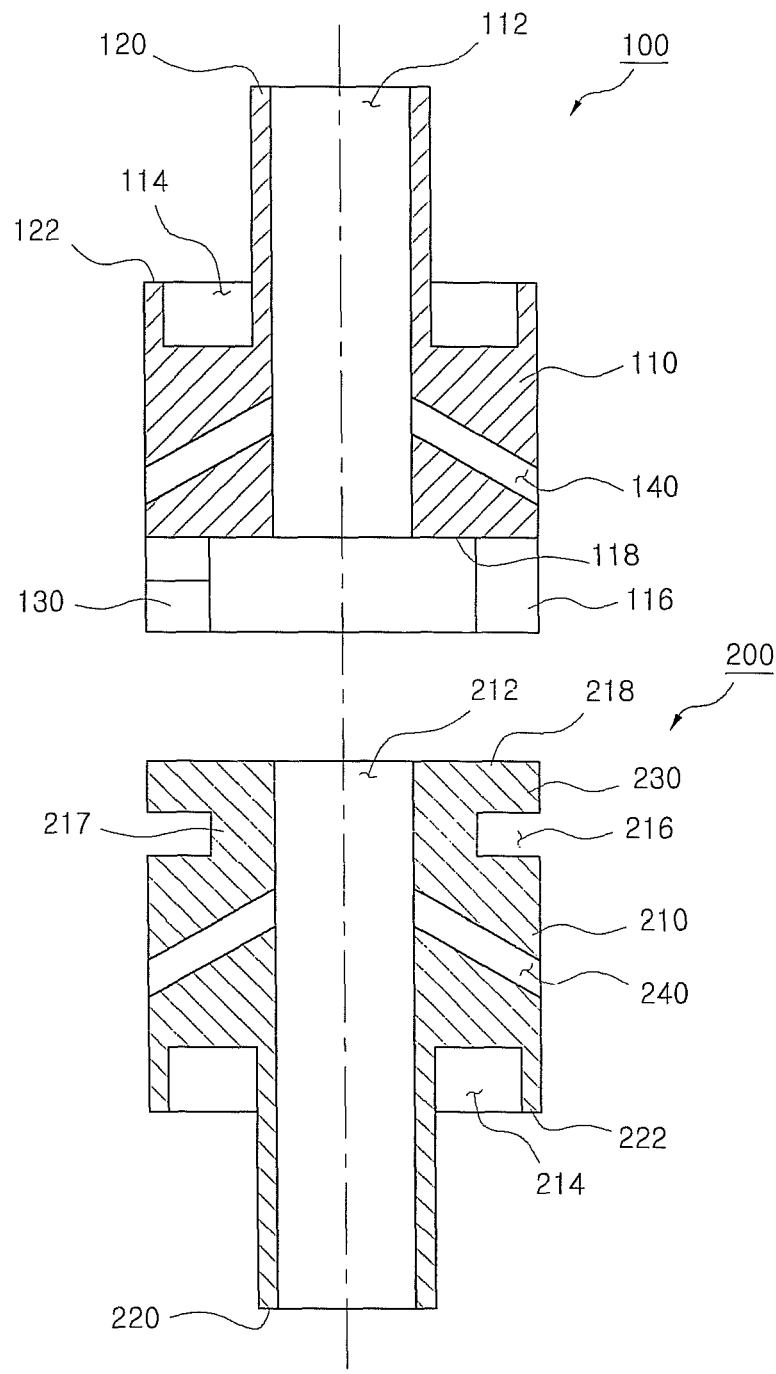
FIG. 5 is a sectional view taken along the line A-A' of the first end plug of FIG. 3 and the line B-B' of the second end plug of FIG. 4.
Figure 6:
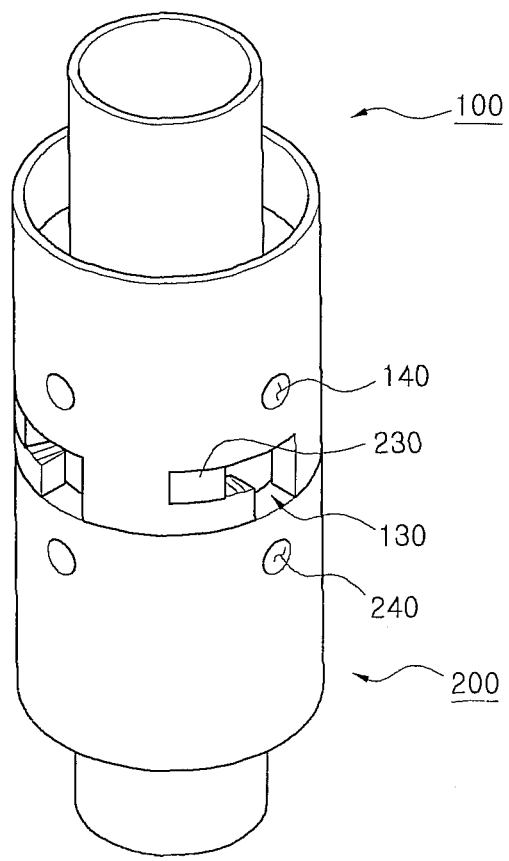
FIG. 6 is an assembled perspective view illustrating first and second end plugs according to an embodiment of the present invention.

As illustrated in FIGS. 3 and 5, the first end plug 100 includes a cylindrical body 110, in the center of which a through-hole 112 is formed in a longitudinal direction. Here, one of circular upper and lower surfaces of the body 110 is provided with an annular groove 114 between an outer circumference thereof and an outer circumference of the through-hole 112, and the other is provided with an annular protrusion 116 protruding along an outer circumference thereof, and a first flat coupling face 118 inside the protrusion 116.

Figure 4:
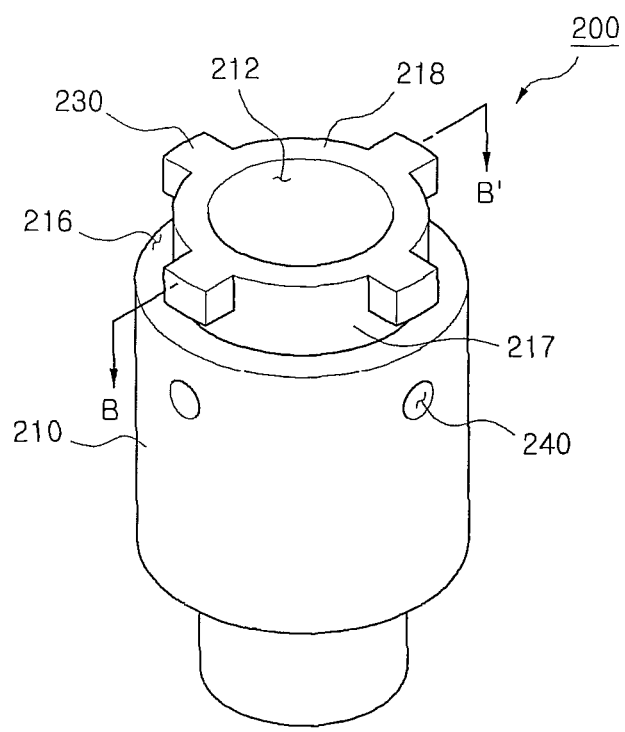
FIG. 4 is a perspective view illustrating a second end plug according to an embodiment of the present invention.

As illustrated in FIGS. 4 and 5, the second end plug 200 is configured as a cylindrical member having a body 210 and a through-hole 212 having the same respective diameters as the body 110 and through-hole 112 of the first end plug 110. Here, one of circular upper and lower surfaces of the body 210 is provided with a groove 214 identical to the groove 114 of the first end plug 100, and the other is provided with a cylindrical insert 217 having an annular space 216 along an outer circumference thereof so as to correspond to the annular protrusion 116 of the first end plug 100, and a second flat coupling face 218 on an upper surface of the insert 217.

The first and second end plugs 100 and 200 having the aforementioned configuration are coupled with each other in such a manner that the protrusion 116 of the first end plug 100 enters the annular space 216 of the second end plug 200, so that the first and second coupling faces 118 and 218 are engaged with each other. After the first and second end plugs 100 and 200 are coupled, they are subjected to resistance welding or laser welding, and thereby are further firmly coupled.

Meanwhile, in an exemplary embodiment of the present invention, the coupling between the first and second end plugs 100 and 200 is based on a quick-connection mode.

The quick-connection mode based coupling is accomplished by forming "L" shaped coupling recesses 130, each of which is partially open, in the protrusion 116 of the first end plug 100, and latches 230 fitted into the respective coupling recesses 130 on an outer circumference of the insert 217 of the second end plug 217. Thus, the latches 230 are inserted into inserting openings 132 that are the open ends of the coupling recesses 130 first, and then are turned along flat seats 134 extending from the inserting openings 132 perpendicular to the inserting openings 132. Thereby, the first and second end plugs 100 and 200 are rapidly and simply coupled with each other. A rotating angle required to fully insert the latches 230 into the seats 134 is properly about 15° in consideration of actual workability, so that an angle of circumference of each seat 134 is preferably limited to about 15°.

The number of coupling recesses 130 is identical to that of the latches 230. Further, the latches 230 are formed on the outer circumference of the insert 217 of the second end plug 200 so as to correspond to positions where the coupling recesses 130 are formed. The number of coupling recesses 130 and the number of latches 230 can be set to one or two or more, and preferably four in consideration of the strength of the protrusion 116 of the first end plug 100.

Particularly, each of the seats 134 of the coupling recesses 130 is provided with a locking step 136 protruding in the shape of a hill so as to prevent the coupling between the coupling recesses 130 and the latches 230 from becoming loosened. In this manner, when the locking steps 136 slightly protruding in the shape of a hill are formed on the respective seat 134 adjacent to the inserting openings 132, the latches 230 can be inhibited from returning to their original state before being coupled after being seated on the coupling recesses 130. At this time, the top of each locking step 136 is smoothly formed as in a curved or flat plane, and the latches 230 can be prevented from being damaged to their surfaces while riding across the locking steps 136.

Meanwhile, in the case of inner and outer annular faces 120 and 122 located inside and outside the groove 114 of the first end plug 100, the former preferably protrudes higher than the latter. This relationship is equally applied to inner and outer annular faces 220 and 222 located inside and outside the groove 214 of the second end plug 200. This is attributable to the fact that the segmented dual-cooled fuel rod is configured of concentric inner and outer cladding tubes, the inner annular faces 120 and 220 of the first and second and plugs 100 and 200 are welded to the inner cladding tube first, and then the outer annular faces 122 and 222 of the first and second end plugs 100 and 200 are welded to the outer cladding tube. In other words, the inner annular faces 120 and 220 are configured to protrude higher than the outer annular faces 122 and 222, so that the inner annular faces 120 and 220 can be welded to the inner cladding tube while avoiding interfering with the outer annular faces 122 and 222.

At least one of the first and second end plugs 100 and 200, particularly one used as a lower intermediate end plug of a segmented upper fuel rod 600, which will be described below, is preferably provided with at least one of complementary channel holes 140 and 240 communicating with the through-holes 112 and 212. For example, when an internal channel 540 of the segmented lower fuel rod (i.e. upstream of the coolant) is blocked, the coolant can be complemented into the internal channel 540 through the complementary channel hole 140 formed in the lower intermediate end plug located above the segmented lower fuel rod, thereby reducing a possibility of causing departure from nuclear boiling ratio (DNBR) attributable to the failure to supply the coolant to the entire internal channel 540 of the dual-cooled fuel rod 500.

Figure 7:
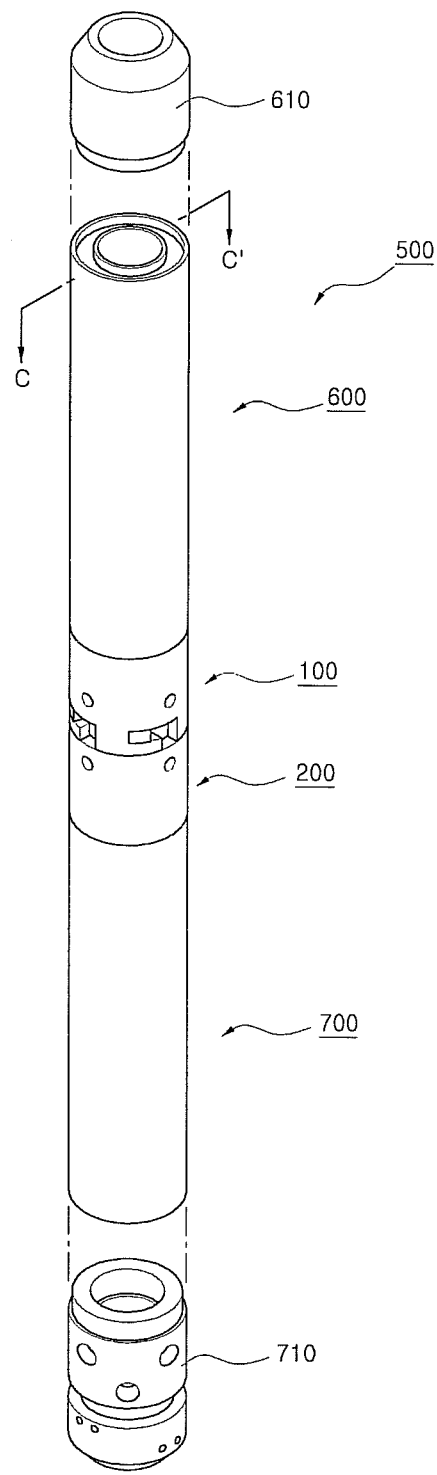
FIG. 7 is a perspective view illustrating a dual-cooled fuel rod configured of segmented upper and lower fuel rods having respective first and second end plugs according to an embodiment of the present invention.
Figure 8:
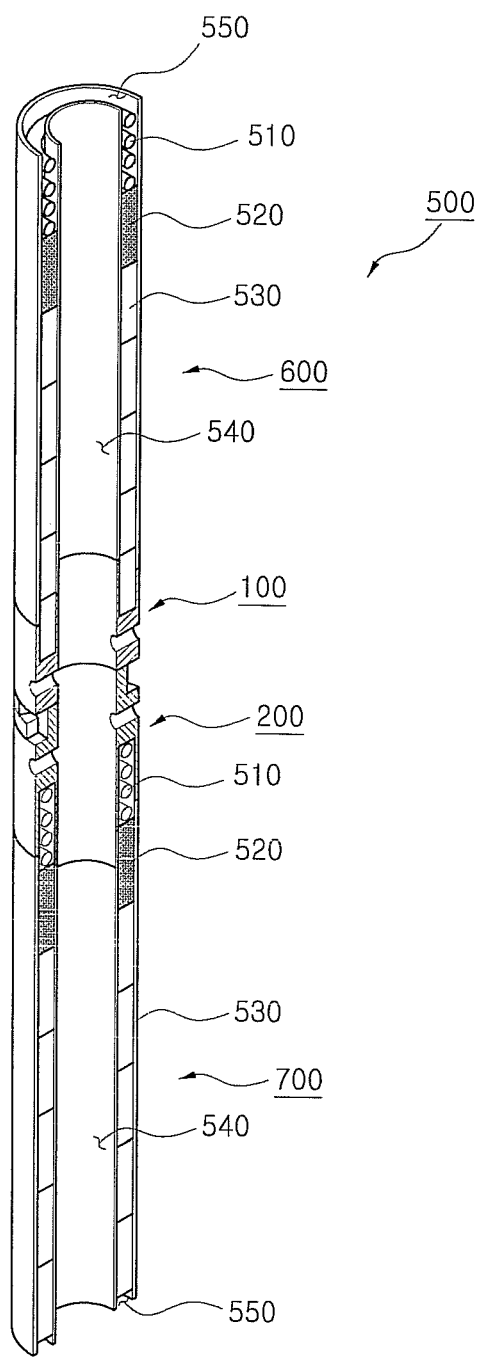
FIG. 8 is a cross-sectional perspective view taken along the line A-A' of the dual-cooled fuel rod of FIG. 7.

Meanwhile, as illustrated in FIGS. 7 and 8, the dual-cooled fuel rod 500 is configured of a segmented upper fuel rod 600 having the lower intermediate end plug as the first end plug 100, and a segmented lower fuel rod 700 having the upper intermediate end plug as the second end plug 200. With the configuration of the segmented upper and lower fuel rods 600 and 700, the dual-cooled fuel rod 500 can be configures by coupling the two segmented fuel rods 600 and 700 halving the elongation ratio compared to that of a conventional dual-cooled fuel rod. Here, the segmented upper fuel rod 600 refers to a segmented fuel rod having the upper end plug 610 at an upper end thereof, i.e. disposed at the uppermost portion of the dual-cooled fuel rod 500. Similarly, the segmented lower fuel rod 700 refers to a segmented fuel rod having the lower end plug 710 at a lower end thereof, i.e. disposed at the lowermost portion of the dual-cooled fuel rod 500. Further, the intermediate end plugs designate end plugs used for the segmented fuel rods 600, 700 and 800, excluding the upper and lower end plugs 610 and 710.

Figure 9:
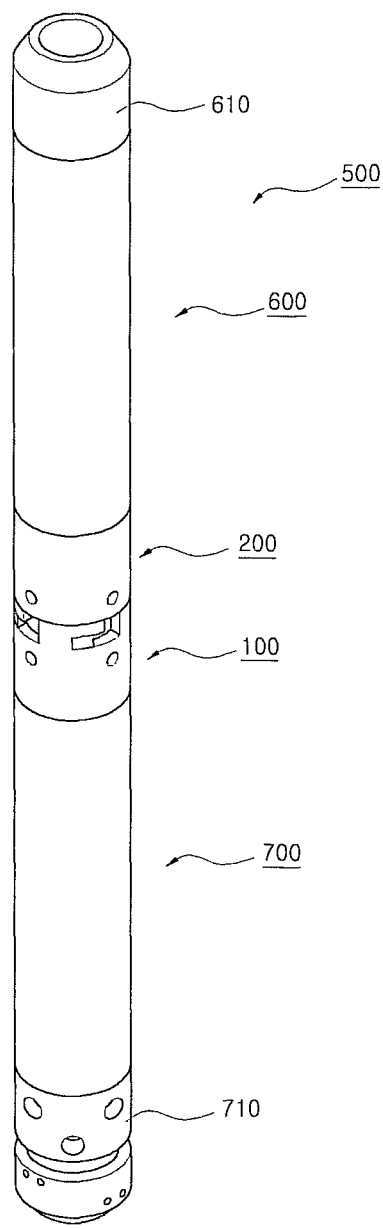
FIG. 9 is a perspective view illustrating a dual-cooled fuel rod configured of segmented upper and lower fuel rods having respective second and first end plugs according to another embodiment of the present invention.

Further, as illustrated in FIG. 9, the dual-cooled fuel rod 500 can be configured of a segmented upper fuel rod 600 having the lower intermediate end plug as the second end plug 200, and a segmented lower fuel rod 700 having the upper intermediate end plug as the first end plug 100. In other words, both the first end plug 100 and the second end plug 200 can be freely selected as the upper or lower intermediate end plug, and thus do not need to be limited to the respective lower or upper intermediate end plug.

Figure 10:
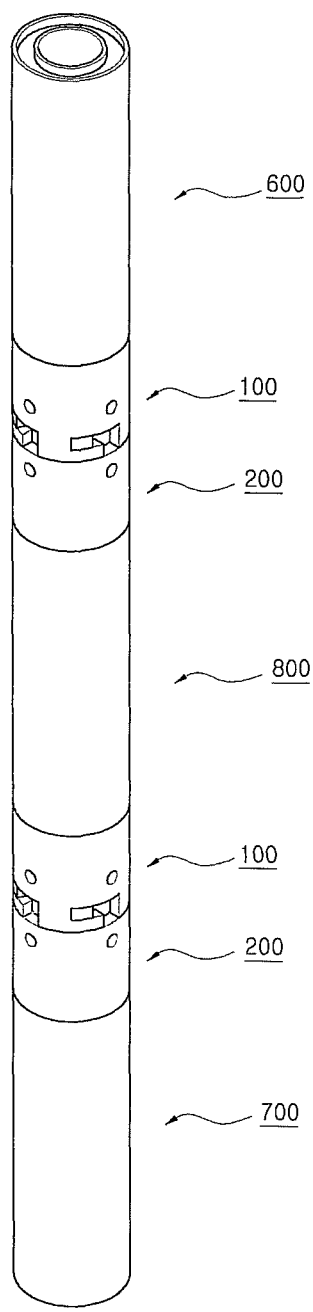
FIG. 10 is a perspective view illustrating a dual-cooled fuel rod configured of a segmented intermediate fuel rod in addition to the segmented upper and lower fuel rods of the dual-cooled fuel rod of FIG. 7 according to another embodiment of the present invention.

Furthermore, as well illustrated in FIG. 10, at least one segmented intermediate fuel rod 800 having the first and second end plugs 100 and 200 at opposite ends thereof is disposed between the segmented upper fuel rod 600 and the segmented lower fuel rod 700. This structure means that the dual-cooled fuel rod 500 can be configured of three or more segmented fuel rods 600, 700 and 800. Accordingly, the dual-cooled fuel rod 500 can freely adjust the elongation ratios of the segmented fuel rods 600, 700 and 800.

According to the aforementioned configuration, the elongation ratios of the segmented upper fuel rod 600, segmented lower fuel rod 700, and segmented intermediate fuel rod 800 can be adjusted to a range from 100 to 200.

Meanwhile, at least one of the first and second end plugs 100 and 200 is provided with at least one of complementary channel holes 140 and 240 communicating with the through-holes 112 and 212. Particularly, the first or second end plug 100 or 200 used as the lower intermediate end plug of the segmented upper fuel rod 600 is effectively provided with the complementary channel hole 140 or 240. Thus, the coolant introduced into the complementary channel holes 140 and 240 enters the internal channel 540 of the dual-cooled fuel rod 500 through the through-holes 112 and 212.

It is effective to form the complementary channel holes 140 and 240 so as to be inclined toward the segmented upper fuel rod 600. This is because the coolant flows from the top to the bottom in the reactor core. At this time, the reason the inclined direction of the complementary channel holes 140 and 240 is set on the basis of the segmented upper fuel rod 600 is because the inclined directions are opposite to each other depending on whether the first and second end plugs 100 and 200 are used as the upper intermediate end plug or the lower intermediate end plug. This can be easily understood if FIG. 5 is turned 180°.

Further, a plenum spring 510 and a spacer 520 can be installed in inner annular spaces of the segmented upper fuel rod 600, segmented lower fuel rod 700, and segmented intermediate fuel rod 800. The plenum spring 510 inhibits vibration of the annular pellet fuel rod, and allows for lengthwise growth of the annular pellet caused by irradiation growth. The spacer 520 is interposed between the plenum spring 510 and the annular pellet so as to prevent the plenum spring 510 from coming into direct contact with the annular pellet, and adjusts a contracted length of the plenum spring 510 such that a proper spring force is applied to the annular pellet.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An intermediate end plug assembly for a segmented fuel rod comprising:
    a first end plug having an outer cylindrical body including an inner cylindrical body, in a center of which a through-hole is formed in a longitudinal direction, the outer cylindrical body having an annular groove in one of circular upper and lower surfaces thereof between an outer circumference thereof and an outer circumference of the inner cylindrical body, and an annular protrusion protruding along an outer circumference thereof and a first flat coupling face inside the protrusion on the other surface thereof; and
    a second end plug having a cylindrical member, which has a body and a through-hole having diameters identical to those of the respective body and through-hole of the first end plug, the body of the second end plug having a groove identical to the groove of the first end plug in one of circular upper and lower surfaces thereof, and a cylindrical insert having an annular space along an outer circumference thereof so as to correspond to the annular protrusion of the first end plug and a second flat coupling face on an upper surface of the insert on a second surface thereof,
    wherein the protrusion of the first end plug is inserted into the annular space of the second end plug, so that the first and second coupling faces come into close contact with each other,
    wherein the annular protrusion has "L" shaped coupling recesses, each of which is partially open, and the insert of the second end plug has latches fitting into the respective coupling recesses on an outer circumference thereof,
    wherein the latches protrude in the outside direction of the insert,
    wherein each coupling recess includes a seat having a locking step protruding in a predetermined height,
    wherein, in comparison of inner and outer annular faces located inside and outside grooves of the first and second end plugs, the inner annular face protrudes higher than the outside annular face.

2. The intermediate end plug assembly as set forth in claim 1, wherein the coupling recesses and the latches are equal to each other in number, and the latches are formed on the outer circumference of the inset of the second end plug so as to correspond to a position where the coupling recesses are formed.

3. The intermediate end plug assembly as set forth in claim 1, wherein, in comparison of inner and outer annular faces located inside and outside grooves of the first and second end plugs, the former protrudes higher than the latter.

4. The intermediate end plug assembly as set forth in claim 1, wherein at least one of the first and second end plugs has at least one complementary channel hole communicating with the through-hole.

5. A dual-cooled fuel rod comprising:
    a segmented upper fuel rod;

an upper intermediate end plug connected to the segmented upper fuel rod;

a lower intermediate end plug connected to the upper intermediate end plug; and a segmented lower fuel rod connected to the lower intermediate end plug, wherein the upper intermediate end plug has a cylindrical member, which has a body and a through-hole having diameters identical to those of the respective body and through-hole of the lower intermediate end plug, the body of the upper intermediate end plug having a groove identical to the groove of the lower intermediate end plug in one of circular upper and lower surfaces thereof, and a cylindrical insert having an annular space along an outer circumference thereof so as to correspond to the annular protrusion of the lower intermediate end plug and a second flat coupling face on an upper surface of the insert on a second surface thereof, wherein the lower intermediate end plug has an outer cylindrical body including an insert cylindrical body, in a center of which a through-hole is formed in a longitudinal direction, the outer cylindrical body having an annular groove in one of circular upper and lower surfaces thereof between an outer circumference thereof and an outer circumference of the inner cylindrical body, and an annular protrusion protruding along an outer circumference thereof and a first flat coupling face inside the protrusion on the other surface thereof, wherein the protrusion of the upper intermediate end plug is inserted into the annular space of the lower intermediate end plug, so that the first and second coupling faces come into close contact with each other, wherein the annular protrusion has "L" shaped coupling recesses, each of which is partially open, and the insert of the lower intermediate end plug has latches fitting into the respective coupling recesses on an outer circumference thereof, wherein the latches protrude in the outside direction of the insert, wherein each coupling recess includes a seat having a locking step protruding in a predetermined height, wherein, in comparison of inner and outer annular protrusions located inside and outside grooves of the upper intermediate and lower intermediate end plugs, the inner annular protrusion protrudes higher than the outside annular protrusion.

6. The dual-cooled fuel rod as set forth in claim 5, wherein at least one of the upper intermediate end plug and lower intermediate end plug has at least one complementary channel hole, which communicates with the through-hole and is inclined toward the segmented upper fuel rod.

7. The dual-cooled fuel rod as set forth in claim 5, wherein each of the segmented upper and lower fuel rods has a plenum spring and a spacer installed in an inner annular space thereof.

8. The dual-cooled fuel rod as set forth in claim 5, wherein each of the segmented upper and lower fuel rods has an elongation ratio ranging from 100 to 200.

* * * * *